US011990078B1

(12) United States Patent
Yoshiga

(10) Patent No.: US 11,990,078 B1
(45) Date of Patent: May 21, 2024

(54) ELECTRONIC DEVICE

(71) Applicant: Innolux Corporation, Miaoli County (TW)

(72) Inventor: Masahiro Yoshiga, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/979,001

(22) Filed: Nov. 2, 2022

(51) Int. Cl.
*G09G 5/10* (2006.01)
*G09G 3/20* (2006.01)
*G09G 3/3233* (2016.01)

(52) U.S. Cl.
CPC ......... *G09G 3/2074* (2013.01); *G09G 3/3233* (2013.01); *G09G 2300/0452* (2013.01); *G09G 2300/0842* (2013.01); *G09G 2320/0242* (2013.01); *G09G 2360/16* (2013.01)

(58) Field of Classification Search
CPC ............... G09G 3/2074; G09G 3/3233; G09G 2300/0452; G09G 2300/0842; G09G 2320/0242; G09G 2360/16
USPC .......................................................... 345/690
See application file for complete search history.

(56) References Cited

U.S. PATENT DOCUMENTS

2013/0050528 A1* 2/2013 Hsu ...................... H04N 23/843 348/E9.053
2016/0293121 A1* 10/2016 Zeng .................... G09G 3/3607
2022/0093035 A1* 3/2022 Watsuda .............. G09G 3/3233

FOREIGN PATENT DOCUMENTS

CN 108320707 7/2018

* cited by examiner

*Primary Examiner* — Jennifer T Nguyen
(74) *Attorney, Agent, or Firm* — JCIPRNET

(57) ABSTRACT

An electronic device includes a color module and a control module. The color module includes a first sub-pixel and a second sub-pixel. The first sub-pixel and the second sub-pixel are adjacent and have different colors. The control module is configured to convert an input data to an output data. The input data includes a first grayscale value of a first color. The output data includes the first grayscale value of the first color and a second grayscale value of a second color, and the first color and the second color are different. The first grayscale value of the output data is provided to the first sub-pixel, and the second grayscale value of the output data is provided to the second sub-pixel.

20 Claims, 8 Drawing Sheets

ELECTRONIC DEVICE

BACKGROUND

Technical Field

The disclosure relates an electronic device, particularly, the disclosure relates to an electronic device including a control module which modifies the grayscale value.

Description of Related Art

A light-emitting device (LED) display apparatus includes a pixel array, and the pixel array includes a plurality of sub-pixels, such as three sub-pixels of red LED, green LED and blue LED. In the LED display apparatus, the red LED, the green LED and the blue LED are respectively driven by different driving currents to determine the grayscales of the light emitted from the LEDs. However, LED with different grayscales may result in different color chromaticities (or color purities), which can be called color shift problem. Taking the green LED for example, when the driving current of the green LED increases, the color of the green light provided by the pixel may occur the color shift problem, such that the color of the green light provided by the pixel becomes higher purity green. On the contrary, as the driving current of the green LED decreases, the color of the green light provided by the pixel may also be shifted, such that the color of the green light becomes reddish.

SUMMARY

An electronic device of the disclosure includes a color module and a control module. The color module includes a first sub-pixel and a second sub-pixel. The first sub-pixel and the second sub-pixel are adjacent and have different colors. The control module is configured to convert an input data to an output data. The input data includes a first grayscale value of a first color. The output data comprises the first grayscale value of the first color and a second grayscale value of a second color, and the first color and the second color are different. The first grayscale value of the output data is provided to the first sub-pixel, and the second grayscale value of the output data is provided to the second sub-pixel.

Based on the above, according to the electronic device of the disclosure, the electronic device can effectively reduce or eliminate the color shift problem of the color module.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
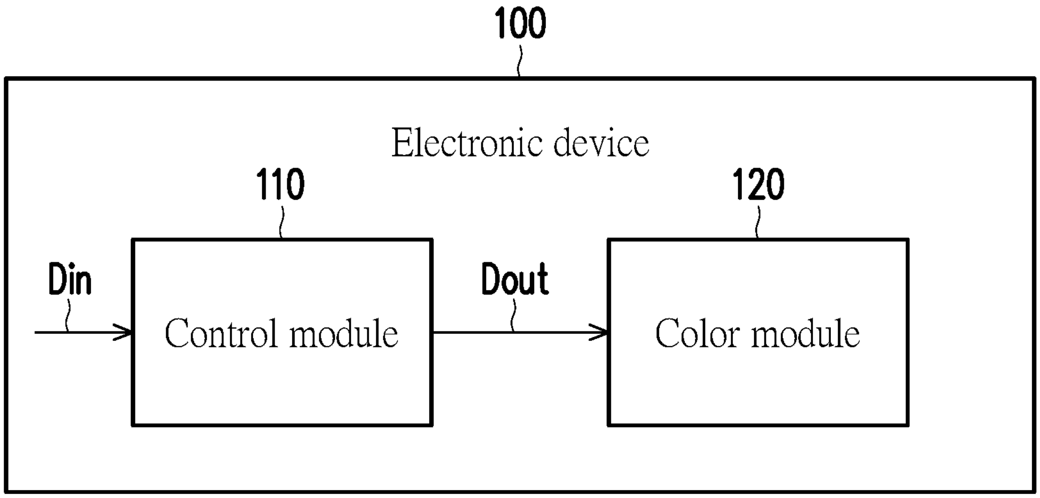
FIG. 1 is a circuit schematic diagram of an electronic device according to an embodiment of the disclosure.

The accompanying drawings are included to provide a further understanding of the disclosure, and are incorporated in and constitute a part of this specification. The drawings illustrate exemplary embodiments of the disclosure and, together with the description, serve to explain the principles of the disclosure.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "couple (or electrically connect)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

The electronic device of the disclosure may include a display device, an antenna device (such as liquid crystal antenna), a sensing device, a lighting device, a touch device, a curved device, a free shape device, a bendable device, flexible device, tiled device or a combination thereof, but is not limited thereto. The electronic device may include light-emitting diode (LED), liquid crystal, fluorescence, phosphor, other suitable materials or a combination thereof, but is not limited thereto. The light emitting diode may include organic light emitting diode (OLED), inorganic light emitting diode such as mini LED, micro LED or quantum dot (QD) light emitting diode (QLED or QDLED), other suitable type of LED or any combination of the above, but is not limited thereto.

Figure 2A:
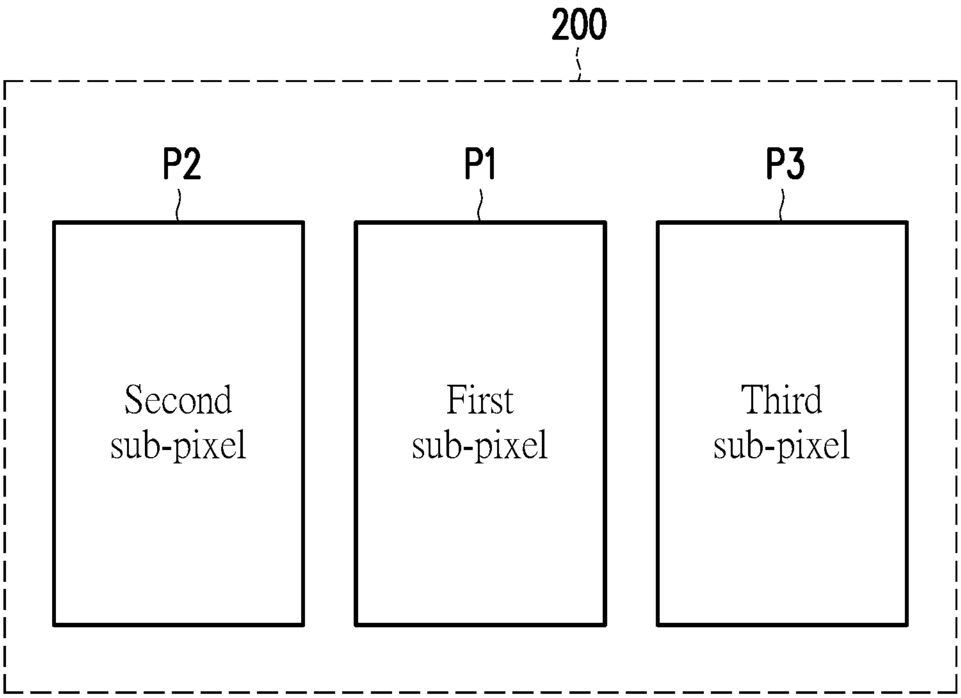
FIG. 2A and FIG. 2B are schematic diagrams of a pixel according to an embodiment of the disclosure.
Figure 2B:
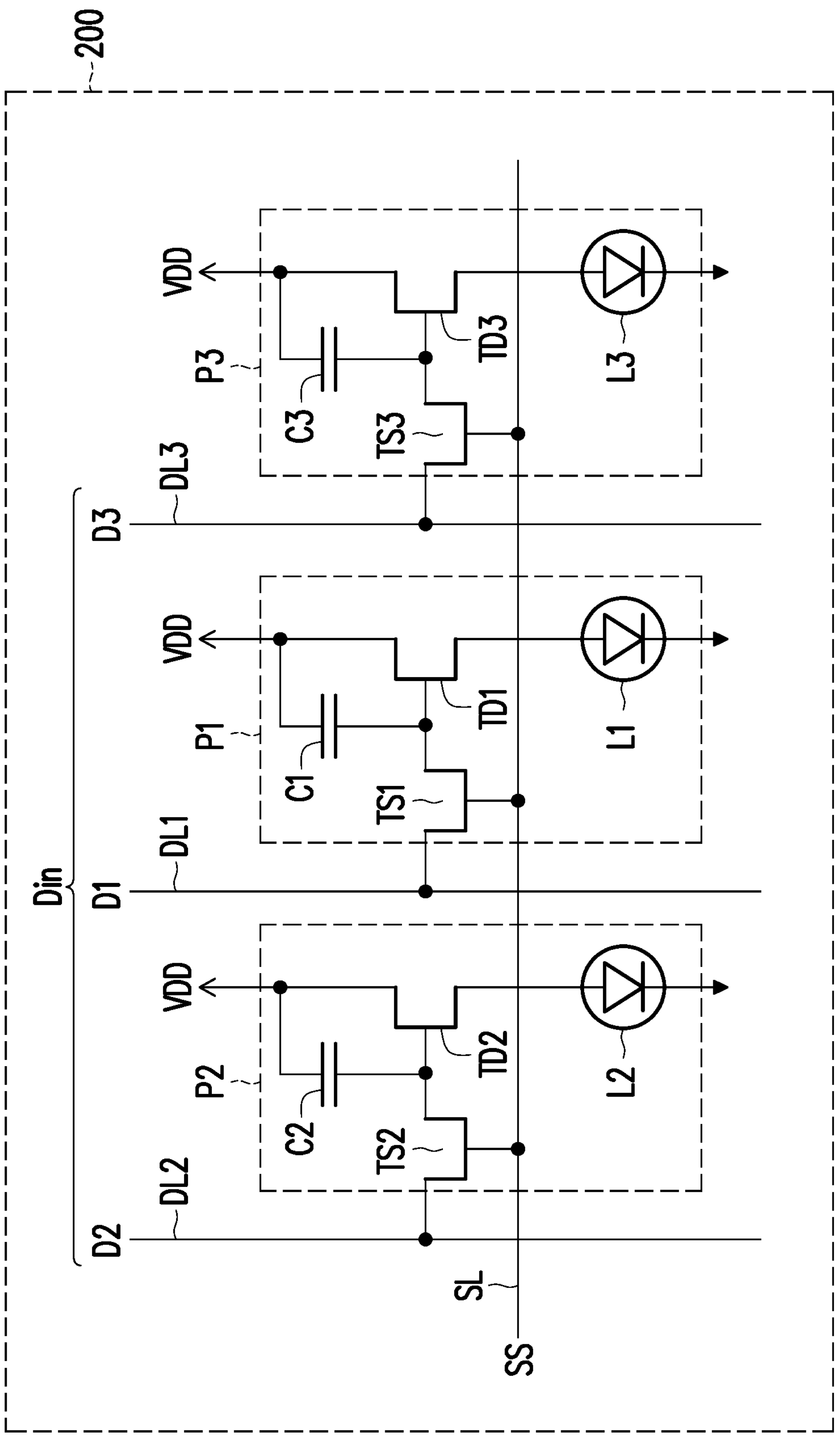

FIG. 1 is a circuit schematic diagram of an electronic device according to an embodiment of the disclosure. FIG. 2A and FIG. 2B are schematics diagram of a pixel according to an embodiment of the disclosure. Referring to FIG. 1, the electronic device 100 includes a control module 110 and a color module 120. The control module 110 is coupled to the color module 120. In the embodiment of the disclosure, the color module 120 may include a plurality of pixels. Referring to FIG. 2A, each pixel 200 may include a first sub-pixel P1 and a second sub-pixel P2. The first sub-pixel P1 and the second sub-pixel P2 are adjacent and have different colors. The control module 110 may receive an input data Din from an image data source, and convert the input data Din to an output data Dout for driving the first sub-pixel P1 and the second sub-pixel P2. The input data Din may include a first grayscale value of a first color and a second grayscale value of a second color, and the first color and the second color are different. The first sub-pixel P1 may be configured to display the first color, and the second sub-pixel may be configured to display the second color. The first grayscale value of the output data Dout is provided to the first sub-pixel P1. The second grayscale value of the output data Dout is provided to the second sub-pixel.

In the embodiment of the disclosure, the electronic device 100 may be a display device. In some embodiments, the color module 120 may be a display panel, such as a liquid crystal display (LCD) panel, an organic light emitting diode display panel, or an inorganic light emitting diode display panel, but the disclosure is not limited thereto. In some embodiments, the color module 120 can be a backlight module. In this case, the electronic device 100 can include an LCD panel, and the backlight module can provide light source to the LCD panel. The backlight module can be a white light backlight module or a RGB backlight module. The RGB backlight module can include red color light emitting elements, green color light emitting elements, and blue color light emitting elements, thus providing white light. In the embodiment of the disclosure, the first color may be green, and the second color may be red, but the disclosure is not limited thereto.

Referring to FIG. 1, FIG. 2A and FIG. 2B, the color module 120 may include a pixel array including a plurality of pixels, and each of the plurality of pixels may be implemented as the pixel 200 of the FIG. 2A and FIG. 2B. In the embodiment of the disclosure, the pixel 200 includes the first sub-pixel P1, the second sub-pixel P2 and a third sub-pixel P3. The first sub-pixel P1 may display the first color. The second sub-pixel P2 may display the second color. The third sub-pixel P3 may display a third color. For example, the first color may be green, the second color may be red, and the third color may be blue, but the disclosure is not limited thereto. As shown in FIG. 2A, the first sub-pixel P1 may be arranged between the second sub-pixel P2 and the third sub-pixel P3, but the disclosure is not limited thereto.

As shown in FIG. 2B, the first sub-pixel P1 includes a transistor TS1, a transistor TD1, a capacitor C1 and a first light emitting element L1. A first terminal of the transistor TS1 is coupled to a data line DL1 to receive a display data D1 (or referred to as data voltage). A second terminal of the transistor TS1 is coupled to a control terminal of the transistor TD1 and the capacitor C1. The control terminal of the transistor TS1 is coupled to the scan line SL to receive the scan signal SS. A first terminal of the transistor TD1 is coupled to a first operation voltage VDD. A second terminal of the transistor TD1 is coupled to the first light emitting element L1. The capacitor C1 is coupled between the first operation voltage VDD and the control terminal of the transistor TD1. The light emitting element L1 is coupled between the second terminal of the transistor TD1 and a second operation voltage VSS.

As shown in FIG. 2B, the second sub-pixel P2 includes a transistor TS2, a transistor TD2, a capacitor C2 and a second light emitting element L2. A first terminal of the transistor TS2 is coupled to a data line DL2 to receive a display data D2 (or referred to as data voltage). A second terminal of the transistor TS2 is coupled to a control terminal of the transistor TD2 and the capacitor C2. The control terminal of the transistor TS2 is coupled to a scan line SL to receive the scan signal SS. A first terminal of the transistor TD2 is coupled to the first operation voltage VDD. A second terminal of the transistor TD2 is coupled to the first light emitting element L2. The capacitor C2 is coupled between the first operation voltage VDD and the control terminal of the transistor TD2. The light emitting element L2 is coupled between the second terminal of the transistor TD2 and a second operation voltage VSS.

As shown in FIG. 2B, the third sub-pixel P3 includes a transistor TS3, a transistor TD3, a capacitor C3 and a third light emitting element L3. A first terminal of the transistor TS3 is coupled to a data line DL3 to receive a display data D3 (or referred to as data voltage). A second terminal of the transistor TS3 is coupled to a control terminal of the transistor TD3 and the capacitor C3. The control terminal of the transistor TS3 is coupled to the scan line SL to receive the scan signal SS. A first terminal of the transistor TD3 is coupled to the first operation voltage VDD. A second terminal of the transistor TD3 is coupled to the first light emitting element L3. The capacitor C3 is coupled between the first operation voltage VDD and the control terminal of the transistor TD3. The light emitting element L3 is coupled between the second terminal of the transistor TD3 and the second operation voltage VSS.

In the embodiment of the disclosure, the control module 110 of FIG. 1 may receive the input data Din, and convert the input data Din to the output data Dout for driving the second sub-pixel P2, the first sub-pixel P1 and the third sub-pixel P3. The output data Dout may include the display data D2, the display data D1 and the display data D3. The display data D2 may include a second grayscale value of the second color. The display data D1 may include a first grayscale value of the first color. The display data D3 may include a third grayscale value of the third color. In the embodiment of the disclosure, the sub-pixel P2, the sub-pixel P1 and the sub-pixel P3 may receive the display data D2, the display data D1 and the display data D3 to drive the light emitting element L2, the light emitting element L1 and the light emitting element L3, respectively.

In the embodiment of the disclosure, the light emitting elements L1, L2 and L3 may be a light emitting diode (LED), a mini-LED or a micro-LED, respectively, but the disclosure is not limited thereto.

In some embodiments of the disclosure, the control module can convert an input data to an output data, and the output data includes a modified grayscale value of a second color, which can compensate the color shift problem of a first color. Thus, the color shift problem can be solved without modifying the design of the pixel circuit. The pixel 200 of the disclosure does not need to additionally design the pixel circuit, and especially does not need to additionally increase the transistors in the pixel circuit. Referring to FIG. 2B, in some embodiments, in one pixel 200, the circuit design in the first sub-pixel P1 and the circuit design in the second sub-pixel P2 can be the same. In some embodiments, in one pixel 200, the circuit design in the first sub-pixel P1, the circuit design in the second sub-pixel P2, and the circuit design in the third sub-pixel P3 can be the same.

Figure 3:
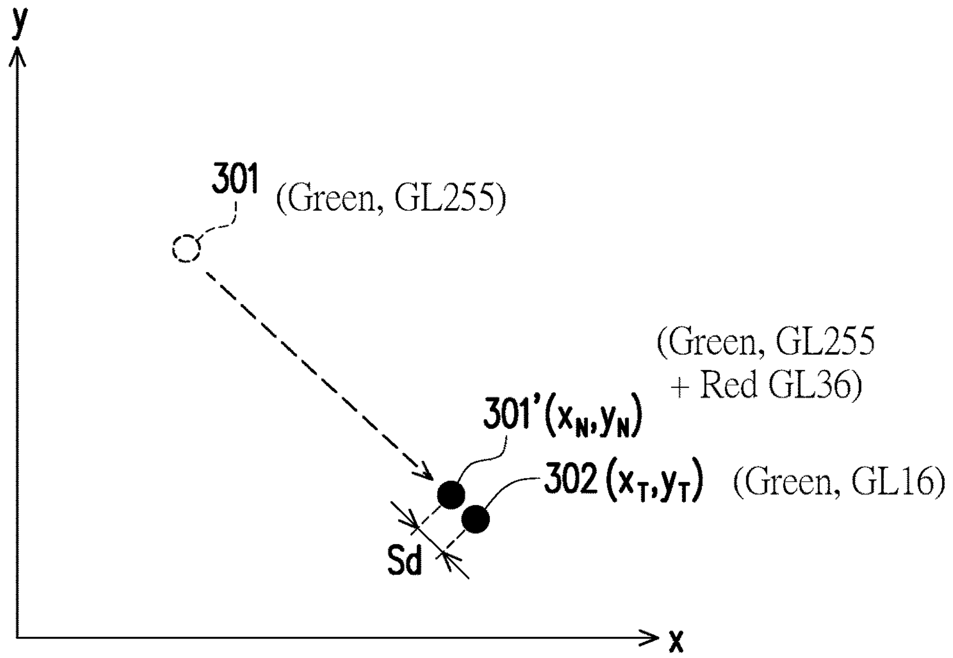
FIG. 3 is a schematic diagram of a chromaticity coordinate system according to an embodiment of the disclosure

FIG. 3 is a schematic diagram of a chromaticity coordinate system (chromaticity diagram) according to an embodiment of the disclosure. Referring to FIG. 1 to FIG. 3, the first sub-pixel P1 may display the first color, and may have a color shift problem. In this embodiment, the first color is green. Referring to a chromaticity coordinate system of FIG. 3, the chromaticity coordinate system of FIG. 3 may correspond to a CIE (International Commission on Illumination) color space (e.g. xy color space). In the embodiment of the disclosure, the first color displayed by the first sub-pixel P1 without the color shift problem (having a normal color tone) may correspond to the color coordinate point 302 on the chromaticity coordinate system of FIG. 3. Thus, the color coordinate point 302 can be regarded as a target coordinate point. However, when the first sub-pixel P1 is driven by the display data D1 including the first grayscale value (specific grayscale value) of the first color, the first color with the color shift problem displayed by the first sub-pixel P1 may correspond to a color coordinate point 301 on the chromaticity coordinate system of FIG. 3. Due to the influence of the color shift problem, the color coordinate of the first color displayed by the first sub-pixel P1 on the chromaticity coordinate system may be shifted from the color coordinate point 302 (the target coordinate point) to the color coordinate point 301. In some embodiments, the color coordinate point 301 may correspond to a higher grayscale (for example, 255), and the color coordinate point 302 may correspond to a lower grayscale (for example, 16).

In the embodiment of the disclosure, in order to overcome the color shift problem of the first color, the control module 110 may adjust the display data D2 of the input data Din used for driving the second sub-pixel P2 adjacent to the first sub-pixel P1, so as to adjust (for example, increase) the second grayscale value of the second color displayed by the sub-pixel P2 to compensate color display result of the first color displayed by the pixel 200. The control module 110 may convert the input data Din to an output data Dout. Specifically, the control module 110 may convert the display data D2 of the input data Din to a modified display data D2' (see FIG. 5) of the output data Dout. For example, the control module 110 may increase the second grayscale value of the second color (e.g. the second grayscale value of the second color plus a compensation value). Thus, the compensated first color displayed by the pixel 200 may correspond to a modified color coordinate point 301', and the modified color coordinate point 301' may be close to or the same as the target color coordinate point 302. That is, the control module 110 may dynamically adjust the second grayscale value of the second color for compensating the first color having different grayscale values to adaptively compensate the first color.

In the embodiment of the disclosure, referring to FIG. 3, the compensation value CD can be determined according to a modified first color coordinate ($x_N$,$y_N$) corresponding to the first color and a target coordinate ($x_T$,$y_T$) corresponding to a target grayscale value of the first color on a chromaticity diagram. Specifically, a first color coordinate of the color coordinate point 301 corresponds to the first grayscale value of the first color (i.e. green grayscale value of 255) and a target coordinate of the target color coordinate point 302 corresponds to a target grayscale value of the first color (i.e. green grayscale value of 16) on the chromaticity diagram. The compensation value is also a grayscale value. Moreover, there is a shortest distance (i.e. a distance Sd as shown in FIG. 3) between a modified first color coordinate corresponding to the compensated first color (i.e. the display result of green grayscale value of 255 plus red grayscale value of 36) and the target coordinate on the chromaticity diagram.

Specifically, the modified first color coordinate ($x_N$,$y_N$) of the color coordinate point 301' may be determined by a following equation (1), wherein the target coordinate ($x_T$,$y_T$) corresponds to the target color coordinate point 302, and the parameter Δxy may represent the distance Sd between the color coordinate point 301' and the target color coordinate point 302. The control module 110 may calculate the modified first color coordinate ($x_N$,$y_N$) of the compensated first color based on the minimum value of the parameter Δxy (e.g. Δxy=0) and the target coordinate ($x_T$,$y_T$). Then, the control module 110 may determine the compensation value according to the modified first color coordinate ($x_N$,$y_N$) of the color coordinate point 301', and the compensation value can be the additional value for the second grayscale value of the second color.

$$\Delta xy = \sqrt{(x_N - x_T)^2 + (y_N - y_T)^2} \qquad \text{equation (1)}$$

For example, the first color may be green, and the second color may be red. When the first sub-pixel P1 is driven by the display data D_G corresponding to the grayscale value of 255 of green (i.e. Green, GL255) (e.g. the grayscale value (R, G, B) of the pixel 200 may be (0,255,0)), the first color with the color shift problem displayed by the first sub-pixel P1 may correspond to the color coordinate point 301 on the chromaticity coordinate system of FIG. 3. Therefore, the control module 110 may adjust (increase) the grayscale value of red displayed by the second sub-pixel P2 to compensate color display result of green of the pixel 200 by the compensation value. The control module 110 may increase the grayscale value of red (e.g. the original grayscale value of red (0) plus the compensation value of 36), thus obtaining the grayscale value of Red, GL36. Thus, the color coordinate point 301' of the compensated green corresponding to the grayscale value of 255 of green and the grayscale value of the grayscale value of red plus the compensation value of 36 displayed by the pixel 200 (i.e. Green, GL255+Red, GL36) (e.g. the grayscale value (R, G, B) of the pixel 200 may be changed to (36,255,0)) may be close to or the same as the target color coordinate point 302 of green corresponding to the grayscale value of 16 of green (i.e. Green, GL16) (e.g. the grayscale value (R, G, B) corresponding to the target color coordinate point 302 may be (0,16,0)).

Figure 4:
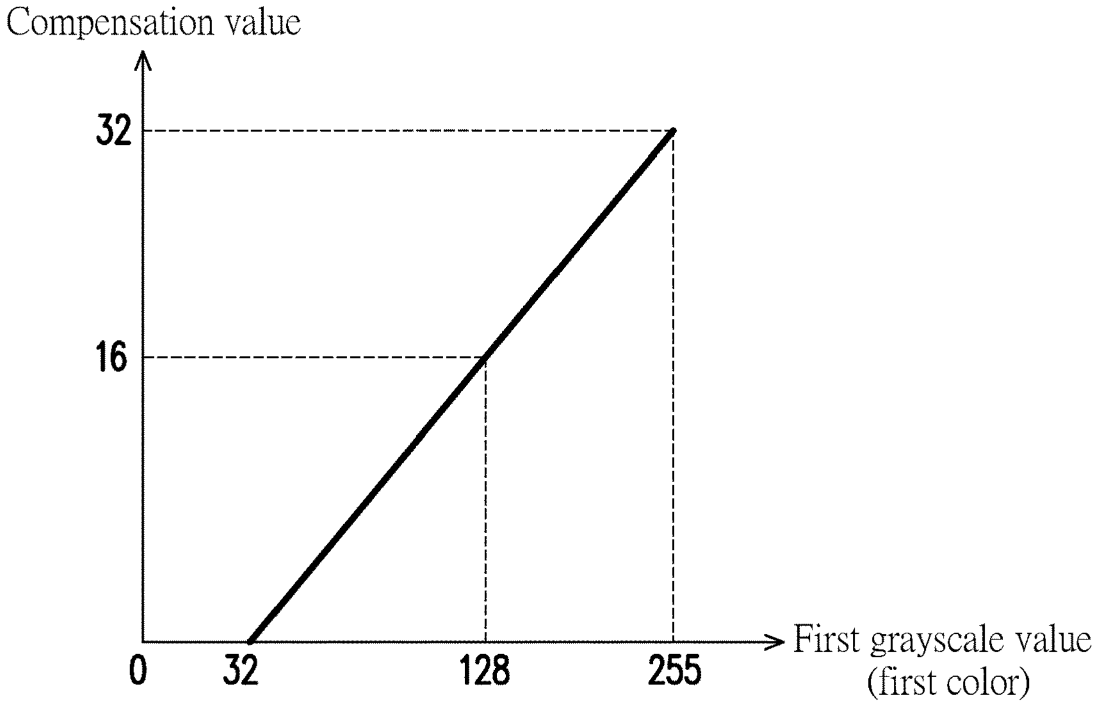
FIG. 4 is a relationship schematic diagram of a first grayscale value and a compensation value according to an embodiment of the disclosure.

FIG. 4 is a relationship schematic diagram of a first grayscale value and a compensation value according to an embodiment of the disclosure. Referring to FIG. 4, in the embodiment of the disclosure, the compensation value for the second color may be proportional to the first grayscale value of the first color, and the compensation value may be smaller than the first grayscale value. As show in FIG. 4, when the first grayscale value of the first color is less than or equal to 16, the compensation value may be 0. When the first grayscale value of the first color is 128, the compensation value may be, for example, 16. When the first grayscale value of the first color is 255, the compensation value may be, for example, 32. The relationship of the first grayscale value and the compensation value may be linear, but the disclosure is not limited thereto. In one embodiment of the disclosure, the relationship of the first grayscale value and the compensation value may be non-linear.

For example, the first color may be green, and the second color may be red. The control module of FIG. 1 may dynamically adjust the grayscale value of red for compensating green having different gray values to adaptively compensate green, so that, as shown as FIG. 3, the color coordinate point corresponding to any compensated green corresponding to any grayscale value showed by the pixel may be close to or the same as the target color coordinate point of green. Thus, for all pixels of the pixel array, the green displayed by the all pixels may be compensated as the above-mentioned manner, so that the green displayed by the whole pixel array can be presented as a consistent chromaticity, and the color shift problem of the green displayed by the whole pixel array can be effectively improved or eliminated. In one embodiment of the disclosure, the color difference of any grayscale of green displayed by the pixel array may be lower than 0.01.

Figure 5:
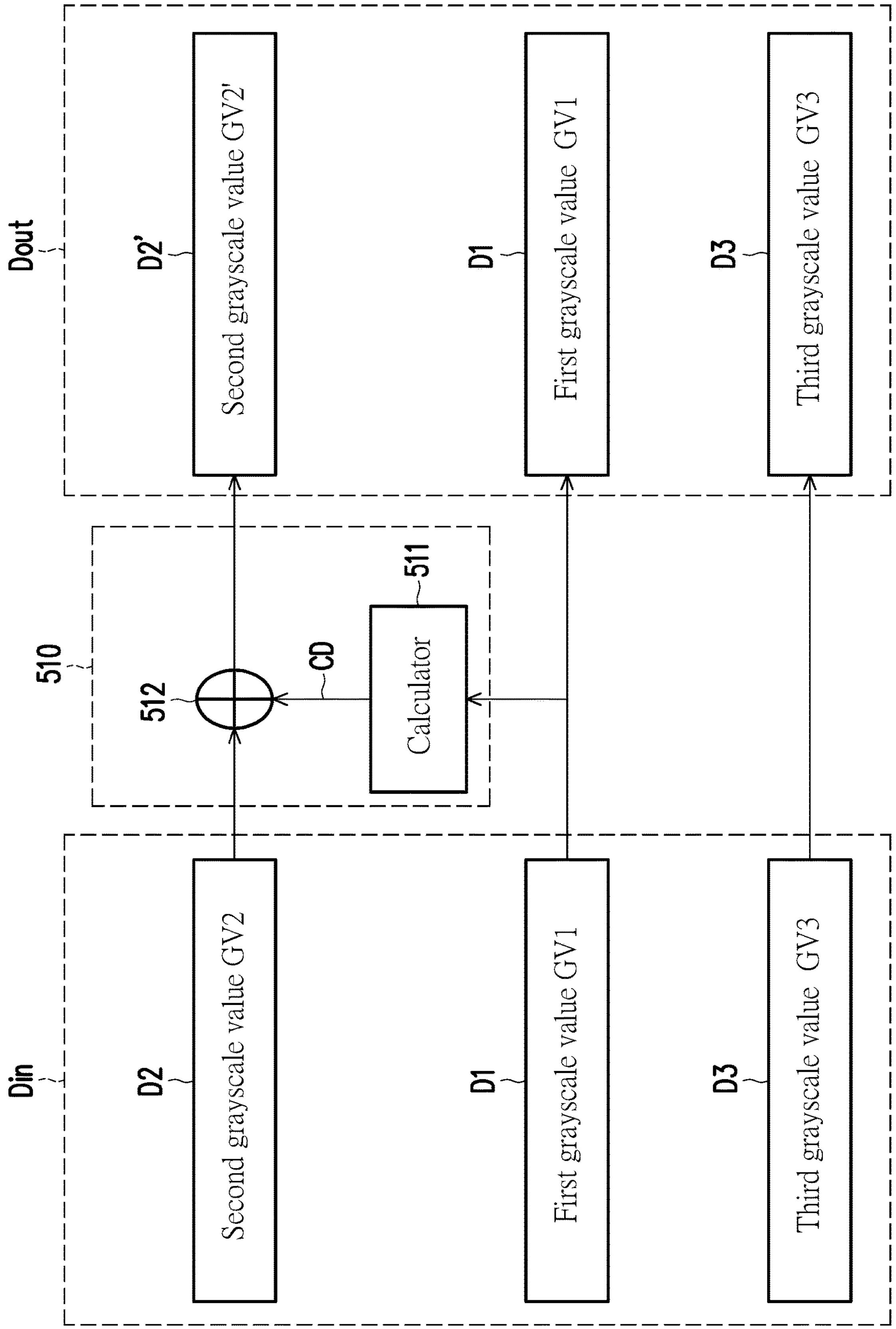
FIG. 5 is a schematic diagram of a control module according to an embodiment of the disclosure.

FIG. 5 is a schematic diagram of a control module according to an embodiment of the disclosure. Referring to FIG. 2A and FIG. 5, the control module 510 may include a calculator 511 and an arithmetic unit 512. The arithmetic unit 512 may include an adder and/or a subtractor, but the disclosure is not limited thereto. In the embodiment of the disclosure, the control module 510 may receive an input data Din form an image data source. The input data Din can include display data D1 to D3. The display data D1 corresponds to the first sub-pixel P1, and the display data D1 includes a (original) first grayscale value GV1. The display data D2 corresponds to the second sub-pixel P2, and the display data D2 includes a (original) second grayscale value GV2. The display data D3 corresponds to the third sub-pixel P3, and the display data D3 includes a (original) third grayscale value GV3. The control module 510 may generate an output data Dout for driving the pixel 200 according to the input data Din. The output data Dout can include display data D1, display data D2' and display data D3. The display data D1 is used for driving the first sub-pixel P1, and the display data D1 includes the (original) first grayscale value GV1. In the output data Dout, the display data D2' is used for driving the second sub-pixel P2, and the display data D2' includes a modified second grayscale value GV2'. The display data D3 is used for driving the third sub-pixel P3, and the display data D3 includes the (original) third grayscale value GV3.

Referring to FIG. 5, in the embodiment of the disclosure, the calculator 511 may calculate a compensation value CD according to the first grayscale value GV1 of the display data D1 by the manner of the embodiment of FIG. 3, and then the arithmetic unit 512 may add the compensation value CD to the original second grayscale value GV2 of the display data D2 to generate the modified second grayscale value GV2' of the display data D2'. The modified second grayscale value GV2' may be equal to the original second grayscale value GV2 plus the compensation value CD.

Referring to FIG. 5, for example, the first color may be green, the second color may be red, and the third color may be blue. The input data Din may include the display data D1 to D3. The display data D1 has the first grayscale value GV1 of 255, the display data D2 has the second grayscale value GV2 of 0, and the display data D3 has the third grayscale value GV3 of 0 (i.e. grayscale value (R, G, B)=(0,255,0)). The calculator 511 may calculate the compensation value CD of 36 according to the first grayscale value GV1 of 255 of the display data D1. Then, the arithmetic unit 512 may add the compensation value CD of 36 to the original second grayscale value GV2 of 0 of the display data D2 to generate the modified second grayscale value GV2' of 36 of the display data D2'. Thus, the first sub-pixel P1 may display the first grayscale value GV1 of 255, the second sub-pixel P2 may display the modified second grayscale value GV2' of 36, and the third sub-pixel P3 may display the third grayscale value GV3 of 0 (i.e. grayscale value (R, G, B)=(36, 255,0)). Therefore, compared to the color shift problem of the original green displayed by the pixel 200 driven by the input data Din, the green displayed by the pixel 200 driven by the output data Dout may effectively reduce or eliminate the color shift problem by adjusting the grayscale value of the adjacent sub-pixel corresponding to red based on the color compensation mechanism.

In this example, referring to FIG. 5, when a calculated sum of the original second grayscale value GV2 plus the compensation value CD exceeds a maximum grayscale value, the control module 510 or the arithmetic unit 512 may output or generate the modified second grayscale value GV2' to be equal to or smaller than the maximum grayscale value. For example, the display data D1 has the first grayscale value GV1 of 255, the display data D2 has the second grayscale value GV2 of 255, and the display data D3 has the third grayscale value GV3 of 0 (i.e. grayscale value (R, G, B)=(255,255,0)). The calculator 511 may calculate the compensation value CD of 36 according to the first grayscale value GV1 of 255 of the display data D1. Then, the arithmetic unit 512 may add the compensation value CD of 36 to the second grayscale value GV2 of 255 of to get a value of 291 (=36+255), but the value exceeds the maximum grayscale value of 255. So, the arithmetic unit 512 may generate the modified second grayscale value GV2' of 255 of the display data D2'. Thus, the first sub-pixel P1 may display the first grayscale value GV1 of 255, the second sub-pixel P2 may display the modified second grayscale value GV2' of 255, and the third sub-pixel P3 may display the third grayscale value GV3 of 0 (i.e. grayscale value (R, G, B)=(255,255,0)).

For another example, referring to FIG. 5, the display data D1 has the first grayscale value GV1 of 255, the display data D2 has the second grayscale value GV2 of 255, and the display data D3 has the third grayscale value GV3 of 0 (i.e. grayscale value (R, G, B)=(255,255,0)). The calculator 511 may calculate the compensation value CD of 36 according to the first grayscale value GV1 of 255 of the display data D1. The arithmetic unit 512 may pre-store a default operation value of −36 (or other values). Then, the arithmetic unit 512 may add the compensation value CD of 36 and the default operation value of −36 to the second grayscale value GV2 of 255 of the display data D2 to generate the modified second grayscale value GV2' of 255 (=255+36-36) of the display data D2'. Thus, the first sub-pixel P1 may display the first grayscale value GV1 of 255, the second sub-pixel P2 may display the modified second grayscale value GV2' of 255, and the third sub-pixel P3 may display the third grayscale value GV3 of 0 (i.e. grayscale value (R, G, B)=(255,255,0)).

For yet another example, referring to FIG. 5, the display data D1 has the first grayscale value GV1 of 0, the display data D2 has the second grayscale value GV2 of 255, and the display data D3 has the third grayscale value GV3 of 0 (i.e. grayscale value (R, G, B)=(255,0,0)). The calculator 511 may calculate the compensation value CD of 0 according to the first grayscale value GV1 of 0 of the display data D1. Then, the arithmetic unit 512 may add the compensation value CD of 0 and a default operation value of −36 to the second grayscale value GV2 of 255 of the display data D2 to generate the modified second grayscale value GV2' of 219 (=255+0-36) of the display data D2'. Thus, the first sub-pixel P1 may display the first grayscale value GV1 of 0, the second sub-pixel P2 may display the modified second grayscale value GV2' of 219, and the third sub-pixel P3 may display the third grayscale value GV3 of 0 (i.e. grayscale value (R, G, B)=(219,0,0)).

In some embodiments of the disclosure, the second grayscale value GV2 of the input data Din may be "0", but the modified second grayscale value GV2' of the output data Dout may not be "0" because adding the compensation value. Therefore, as long as it is determined whether the some color pixels of the pixel circuit of the disputed product with the function of compensating for color shift are turned-on, but the corresponding grayscale values in the input data are "0", it can be known whether the disputed product uses the technical means of the present disclosure to cause infringement.

Figure 6:
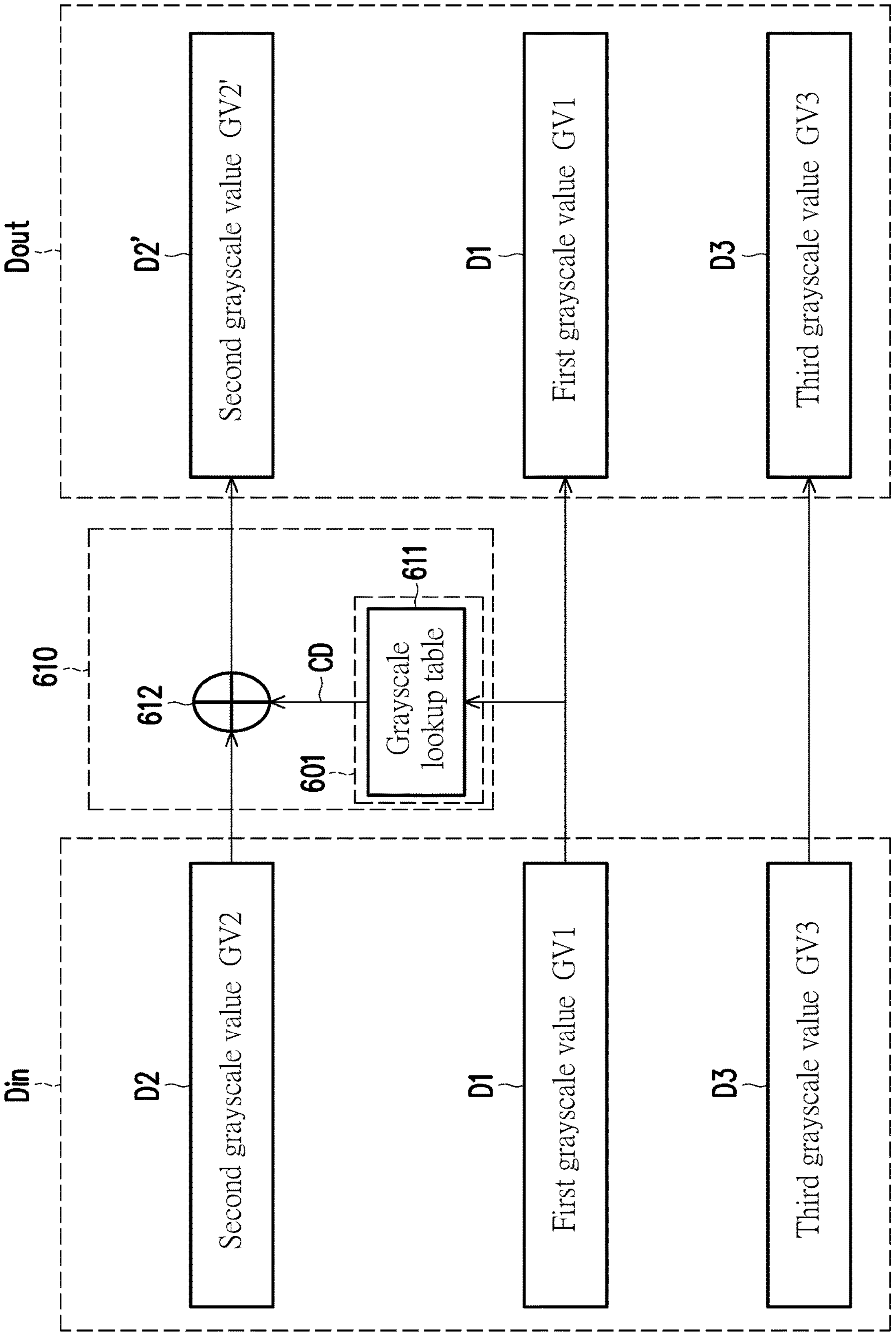
FIG. 6 is a schematic diagram of a control module according to another embodiment of the disclosure.

FIG. 6 is a schematic diagram of a control module according to another embodiment of the disclosure. In the embodiment of disclosure, the electronic device of FIG. 1 may further include a storage unit 601 as shown in FIG. 6, and the storage unit 601 is coupled to the control module 110. The storage unit 601 may store a grayscale lookup table, and the control module 110 may read the grayscale lookup table to obtain the compensation value from the grayscale lookup table. Referring to FIG. 2A and FIG. 6, the control module 610 may include an arithmetic unit 612. The arithmetic unit 612 may include an adder and/or a subtractor, but the disclosure is not limited thereto. In the embodiment of the disclosure, the control module 610 may receive an input data Din form an image data source. The input data Din includes display data D1 to D3. The display data D1 corresponds to the first sub-pixel P1, and the display data D1 includes a (original) first grayscale value GV1. The display data D2 corresponds to the second sub-pixel P2, and the display data D2 includes a (original) second grayscale value GV2. The display data D3 corresponds to the third sub-pixel P3, and the display data D3 includes a (original) third grayscale value GV3. The control module 610 may generate an output data Dout for driving the pixel 200 according to the input data Din. The output data Dout includes display data D1, display data D2' and display data D3. The display data D1 is used for driving the first sub-pixel P1, and the display data D1 includes the (original) first grayscale value GV1. The display data D2' is used for driving the second sub-pixel P2, and the display data D2' includes a modified second grayscale value GV2'. The display data D3 is used for driving the third sub-pixel P3, and the display data D3 includes the (original) third grayscale value GV3.

In the embodiment of the disclosure, referring to FIG. 6, the control module 610 may obtain a compensation value CD from the grayscale lookup table 611 according to the first grayscale value GV1 of the display data D1, and then the arithmetic unit 612 may add the compensation value CD to the second grayscale value GV2 of the display data D2 to generate the modified second grayscale value GV2' of the display data D2'. The modified second grayscale value GV2' may equal to the original second grayscale value GV2 plus the compensation value CD.

For example, referring to FIG. 6, the first color may be green, the second color may be red and the third color may be blue. The input data Din may include the display data D1 to D3. The display data D1 has the first grayscale value GV1 of 255, the display data D2 has the second grayscale value GV2 of 0, and the display data D3 has the third grayscale value GV3 of 0 (i.e. grayscale value (R, G, B)=(0,255,0)). The control module 610 may obtain the compensation value CD of 36 from the grayscale lookup table 611 according to the first grayscale value GV1 of 255 of the display data D1. Then, the arithmetic unit 612 may add the compensation value CD of 36 to the second grayscale value GV2 of 0 of the display data D2 to generate the modified second grayscale value GV2' of 36 of the display data D2'. Thus, the first sub-pixel P1 may display the first grayscale value GV1 of 255, the second sub-pixel P2 may display the modified second grayscale value GV2' of 36, and the third sub-pixel P3 may display the third grayscale value GV3 of 0 (i.e. grayscale value (R, G, B)=(36,255,0)). Therefore, compared to the color shift problem of the original green displayed by the pixel 200 driven by the input data Din, the green displayed by the pixel 200 driven by the output data Dout may effectively reduce or eliminate the color shift problem by adjusting the grayscale value of the adjacent sub-pixel corresponding to red based on the color compensation mechanism. In addition, the control module 610 may also implement the above-mentioned examples of FIG. 5.

Figure 7:
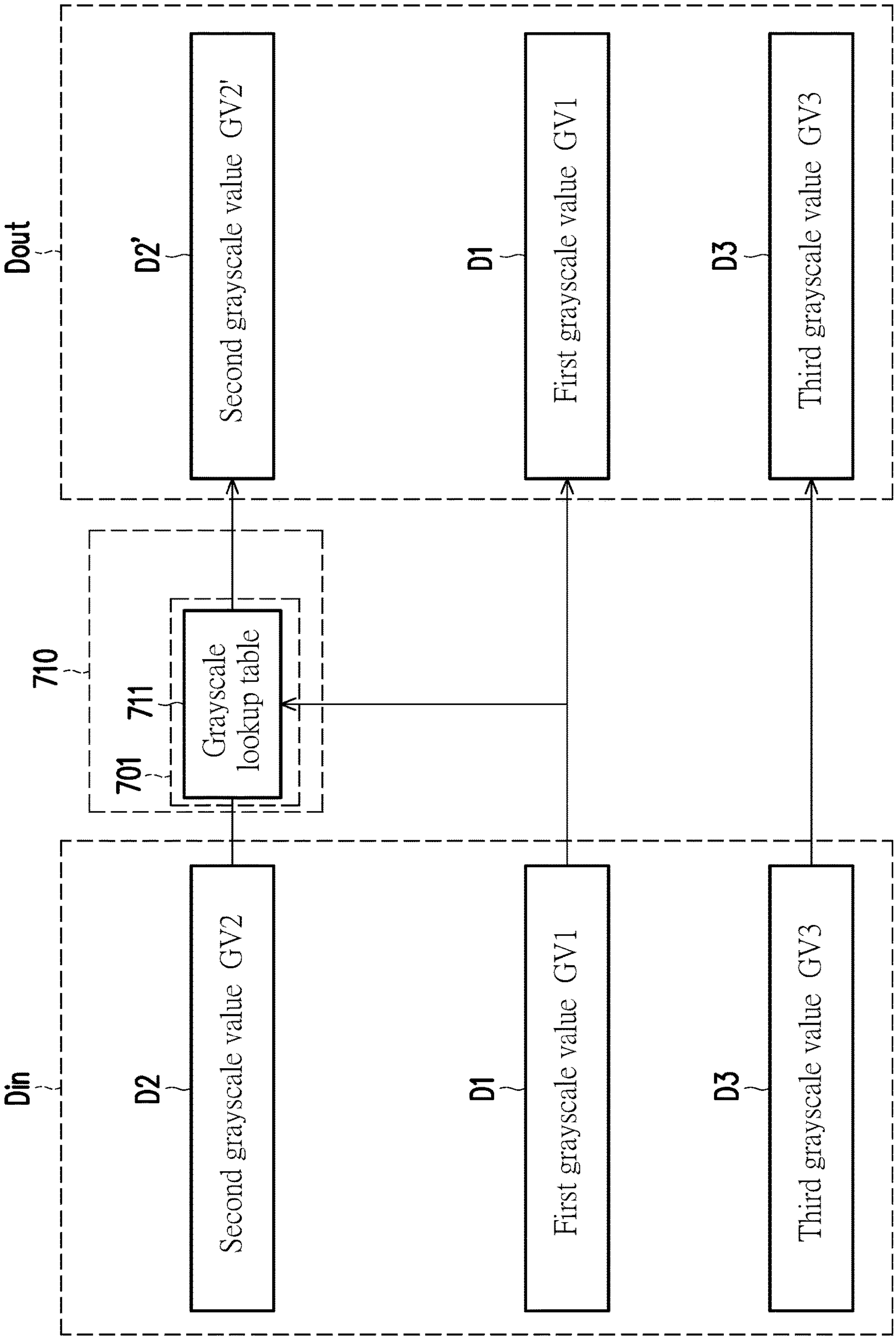
FIG. 7 is a schematic diagram of a control module according to another embodiment of the disclosure.

FIG. 7 is a schematic diagram of a control module according to another embodiment of the disclosure. In the embodiment of disclosure, the electronic device of FIG. 1 may further include a storage unit 701 as shown in FIG. 7, and the storage unit 701 is coupled to the control module 110. The storage unit 701 may store a grayscale lookup table, and the control module 110 may read the grayscale lookup table to convert an input data to an output data. Referring to FIG. 2A and FIG. 7, the control module 710 may directly read the grayscale lookup table. In the embodiment of the disclosure, the control module 710 may receive an input data Din form an image data source. The input data Din includes display data D1 to D3. The display data D1 corresponds to the first sub-pixel P1, and the display data D1 includes a (original) first grayscale value GV1. The display data D2 corresponds to the second sub-pixel P2, and the display data D2 includes a (original) second grayscale value GV2. The display data D3 corresponds to the third sub-pixel P3, and the display data D3 includes a (original) third grayscale value GV3. The control module 710 may generate an output data Dout for driving the pixel 200 according to the input data Din. The output data Dout includes the display data D1, the display data D2' and the display data D3. The display data D1 is used for driving the first sub-pixel P1, and the display data D1 includes the (original) first grayscale value GV1. The display data D2' is used for driving the second sub-pixel P2, and the display data D2' includes a modified second grayscale value GV2'. The display data D3 is used for driving the third sub-pixel P3, and the display data D3 includes the (original) third grayscale value GV3.

In the embodiment of the disclosure, referring to FIG. 7, the control module 710 may directly read the grayscale lookup table 711 according to the first grayscale value GV1 of the display data D1, so as to obtain the modified second grayscale value GV2' of the display data D2'.

For example, the first color may be green, the second color may be red and the third color may be blue. The input data Din may include the display data D1 to D3. The display data D1 has the first grayscale value GV1 of 255, the display data D2 has the second grayscale value GV2 of 0, and the display data D3 has the third grayscale value GV3 of 0 (i.e. grayscale value (R, G, B)=(0,255,0)). The control module 710 may obtain the modified second grayscale value GV2' of 36 of the display data D2' from the grayscale lookup table 711 according to the first grayscale value GV1 of 255 of the display data D1. Thus, the first sub-pixel P1 may display the first grayscale value GV1 of 255, the second sub-pixel P2 may display the modified second grayscale value GV2' of 36, and the third sub-pixel P3 may display the third grayscale value GV3 of 0 (i.e. grayscale value (R, G, B)=(36, 255,0)). Therefore, compared to the color shift problem of the original green displayed by the pixel 200 driven by the input data Din, the green displayed by the pixel 200 driven by the output data Dout may effectively reduce or eliminate the color shift problem by adjusting the grayscale value of the adjacent sub-pixel corresponding to red based on the color compensation mechanism.

Figure 8:
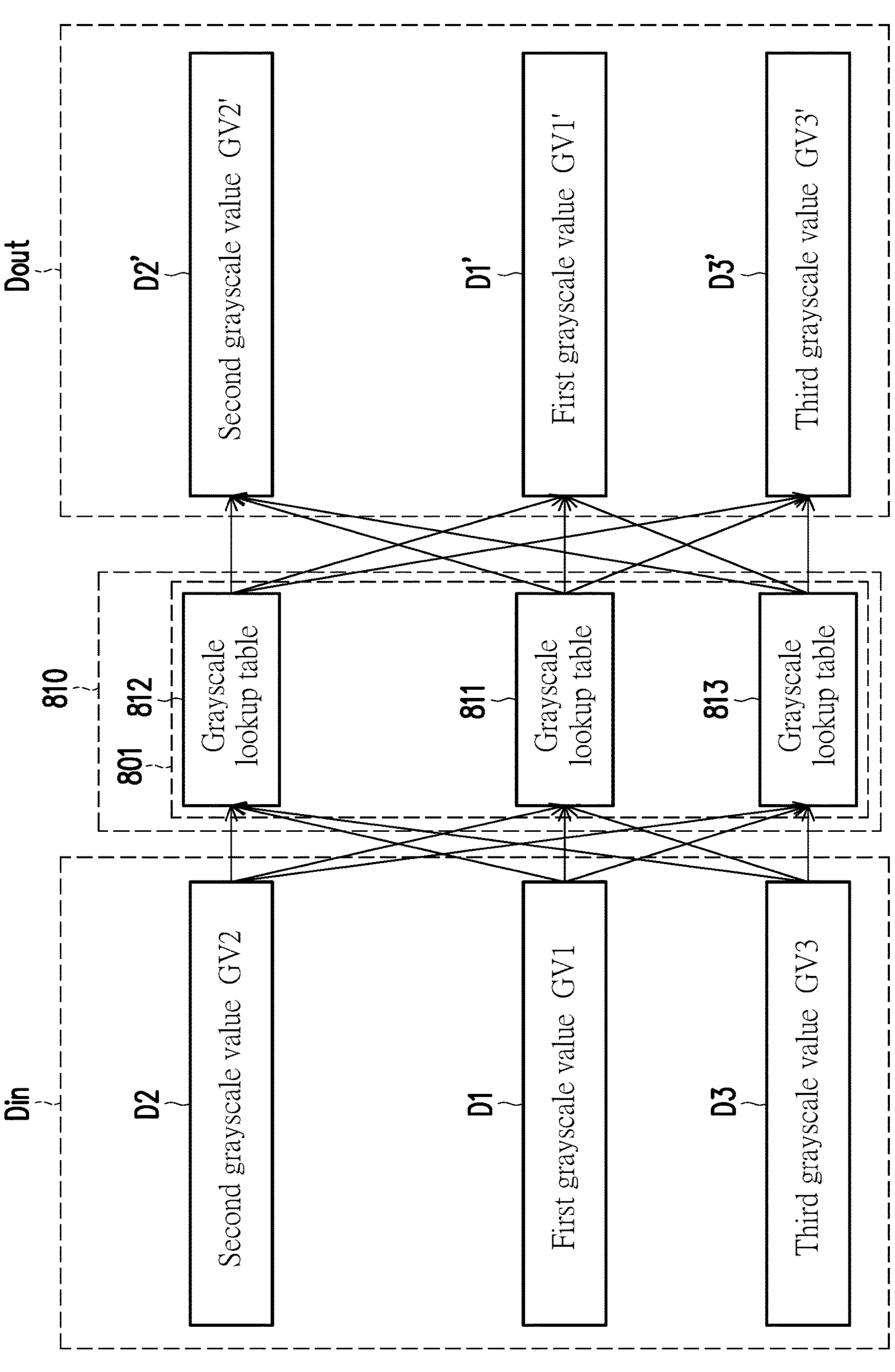
FIG. 8 is a schematic diagram of a control module according to another embodiment of the disclosure.

FIG. 8 is a schematic diagram of a control module according to another embodiment of the disclosure. In the embodiment of disclosure, the electronic device of FIG. 1 may further include a storage unit 801 as shown in FIG. 8, and the storage unit 801 is coupled to the control module 110. The storage unit 801 may store a grayscale lookup table, and the control module 110 may read the grayscale lookup table to convert an input data to an output data. Referring to FIG. 2A and FIG. 8, the control module 810 may directly read the grayscale lookup table. In the embodiment of the disclosure, the control module 810 may receive an input data Din form an image data source. The input data Din includes display data D1 to D3. The display data D1 corresponds to the first sub-pixel P1, and the display data D1 includes a (original) first grayscale value GV1. The display data D2 corresponds to the second sub-pixel P2, and the display data D2 includes a (original) second grayscale value GV2. The display data D3 corresponds to the third sub-pixel P3, and the display data D3 includes a (original) third grayscale value GV3. The control module 810 may generate an output data Dout for driving the pixel 200 according to the input data Din. The output data Dout includes the display data Dr, the display data D2' and the display data D3'. The display data D1' is used for driving the first sub-pixel P1, and the display data D1' includes a modified first grayscale value GV1'. The display data D2' is used for driving the second sub-pixel P2, and the display data D2' includes a modified second grayscale value GV2'. The display data D3' is used for driving the third sub-pixel P3, and the display data D3' includes a modified third grayscale value GV3'.

In the embodiment of the disclosure, referring to FIG. 8, the control module 810 may directly read the grayscale lookup tables 811 to 813 according to the first grayscale value GV1 of the display data D1, the second grayscale value GV2 of the display data D2 and the third grayscale value GV3 of the display data D3, so as to obtain the modified first grayscale value GV1' of the display data D1', the modified second grayscale value GV2' of the display data D2' and the modified third grayscale value GV3' of the display data D3'. Therefore, compared to the color shift problem of the original colors displayed by the pixel 200 driven by the input data Din, the colors displayed by the pixel 200 driven by the output data Dout may effectively reduce or eliminate the color shift problem.

Figure 9:
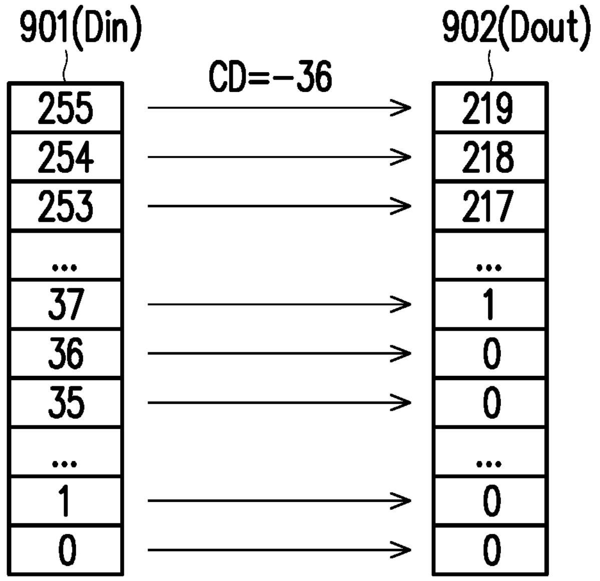
FIG. 9 is a schematic diagram of an input data and an output data according to an embodiment of the disclosure.

FIG. 9 is a schematic diagram of an input data and an output data according to an embodiment of the disclosure. Referring to FIG. 9, in the embodiment of the disclosure, a bit number of an input data 901 may be the same as a bit number of an output data 902. Thus, a number of the grayscale values of the output data 902 may less than a number of the grayscale values of the input data 901. As the above-mentioned examples, if the first grayscale value GV1 of the input data 901 is “255”, and the compensation value is “−36”, the second grayscale value GV2 of the output data 902 is “219”. Analogously, if the first grayscale value GV1 of the input data 901 is any one of “0” to “36”, and the compensation value is “−36”, the second grayscale value GV2 of the output data 902 is “0”. That is, the value range of the first grayscale value GV1 of the input data 901 may be “0” to “255”, and the value range of the second grayscale value GV2 of the output data 902 may be “0” to “219”. Therefore, the value range of the second grayscale value GV2 of the output data 902 may less than the value range of the first grayscale value GV1 of the input data 901.

Figure 10:
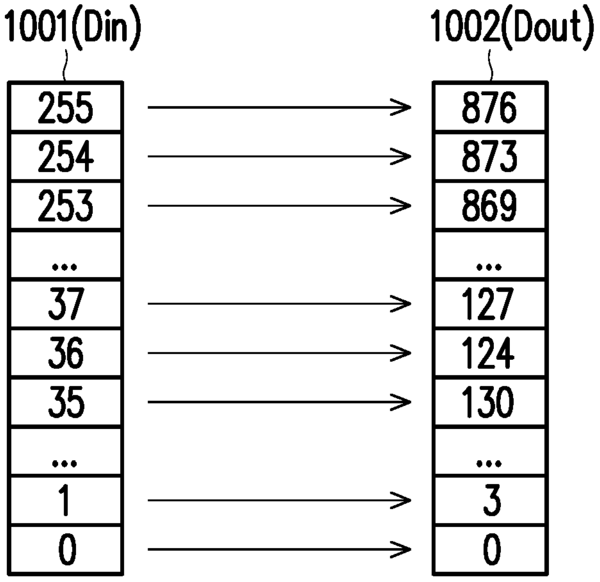
FIG. 10 is a schematic diagram of an input data and an output data according to another embodiment of the disclosure.

FIG. 10 is a schematic diagram of an input data and an output data according to another embodiment of the disclosure. Referring to FIG. 10, in the embodiment of the disclosure, a bit number of an input data 1001 may be smaller than a bit number of an output data 1002. The input data 1001 may be an 8-bit data, and the output data 1002 may be a 10-bit data. The bit number of the output data Dout is larger than a bit number of the input data Din. Thus, a max grayscale value of the output data 1002 may be larger than a max grayscale value of the input data 1001. Moreover, a number of the grayscale values of the output data 1002 may be larger than a number of the grayscale values of the input data 1001. As the above-mentioned examples, if the first grayscale value of the input data 1001 is “255”, and the compensation value is “−143 (converted from −35 (8-bit) to −143 (10-bit))”, the second grayscale value of the output data 1002 is “876 (=1019-143)”. Analogously, if the first grayscale value of the input data 901 is “143” (lowest grayscale value), and the compensation value is “−143”, the second grayscale value of the output data 1002 is “0”. That is, the value range of the first grayscale value of the input data 1001 may be “0” to “255”, and the value range of the second grayscale value of the output data 1002 may be “0” to “876”. Therefore, the value range of the second grayscale value of the output data 1002 may be larger than the value range of the first grayscale value of the input data 1001.

In summary, according to some embodiments, the electronic device includes a color module and a control module. The color module can include a first sub-pixel of a first color and a second sub-pixel of a second color, and the first sub-pixel and the second sub-pixel are adjacent. The control module can convert an input data to an output data, and the output data can include a modified grayscale value of the second color, which can compensate the color shift problem of the first color. According to some embodiments, the specific color displayed by the whole pixel array can be presented as a consistent chromaticity. Moreover, the electronic device of the disclosure does not need to additionally design the pixel circuit, especially does not need to additionally increase the transistors in the pixel circuit, and thus has the advantage of high applicability.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a color module, comprising a first sub-pixel and a second sub-pixel, wherein the first sub-pixel and the second sub-pixel are adjacent and have different colors;

a control module, disposed outside the color module and configured to convert an input data to an output data;

a first data line, wherein the control module is coupled to the first sub-pixel through the first data line; and a second data line, wherein the control module is coupled to the second sub-pixel through the second data line, wherein the input data comprises a first grayscale value of a first color, the output data comprises the first grayscale value of the first color and a second grayscale value of a second color, and the first color and the second color are different, wherein the first grayscale value of the output data is provided to the first sub-pixel through the first data line, and the second grayscale value of the output data is provided to the second sub-pixel through the second data line.

2. The electronic device according to claim 1, wherein the first color is green.

3. The electronic device according to claim 1, wherein the second color is red.

4. The electronic device according to claim 1, wherein the first sub-pixel comprises a first light emitting element, and the second sub-pixel comprises a second light emitting element.

5. The electronic device according to claim 1, wherein the color module comprises a pixel, the pixel comprises the first sub-pixel and the second sub-pixel, the first sub-pixel comprises a first pixel circuit design, the second sub-pixel comprises a second pixel circuit design, and the first pixel circuit design and the second pixel circuit design are the same.

6. The electronic device according to claim 1, wherein the control module generates a compensation value according to the first grayscale value, and generates the second grayscale value according to the compensation value.

7. The electronic device according to claim 6, wherein the compensation value is determined according to a modified color coordinate corresponding to the first color and a target coordinate corresponding to a target grayscale value of the first color on a chromaticity diagram.

8. The electronic device according to claim 7, wherein there is a shortest distance between the modified color coordinate and the target coordinate on the chromaticity diagram.

9. The electronic device according to claim 1, wherein the control module comprises:

an arithmetic unit, configured to generate the second grayscale value according to a compensation value.

10. The electronic device according to claim 9, wherein the compensation value is smaller than the first grayscale value.

11. The electronic device according to claim 9, wherein the control module further comprises:

a calculator, coupled to the arithmetic unit, and configured to calculate the compensation value according to the first grayscale value.

12. The electronic device according to claim 9, wherein the control module further comprises:

a storage unit, coupled to the arithmetic unit, and configured to store a grayscale lookup table, wherein the arithmetic unit obtains the compensation value from the grayscale lookup table.

13. The electronic device according to claim 9, wherein the arithmetic unit is an adder.

14. The electronic device according to claim 13, wherein the input data comprises an original second grayscale value, and the second grayscale value is equal to the original second grayscale value plus the compensation value, wherein when a value of the original second grayscale value plus the compensation value exceeds a maximum grayscale value, the second grayscale value is equal to or smaller than the maximum grayscale value.

15. The electronic device according to claim 1, wherein the control module comprises:

a storage unit, configured to store a grayscale lookup table, wherein the input data is converted to the output data according to the grayscale lookup table.

16. The electronic device according to claim 1, wherein the control module comprises:

a storage unit, configured to store a grayscale lookup table, wherein the grayscale lookup table provides the second grayscale value according to a plurality of original grayscale values of the input data, wherein the plurality of original grayscale values of the input data comprises the first grayscale value.

17. The electronic device according to claim 1, wherein a bit number of the input data is the same as a bit number of the output data.

18. The electronic device according to claim 1, wherein a bit number of the output data is larger than a bit number of the input data.

19. The electronic device according to claim 1, wherein the color module is a display panel.

20. The electronic device according to claim 1, wherein the color module is a backlight module.

* * * * *